United States Patent
Branda et al.

(10) Patent No.: US 7,877,734 B2
(45) Date of Patent: Jan. 25, 2011

(54) SELECTIVE PROFILING OF PROGRAM CODE EXECUTING IN A RUNTIME ENVIRONMENT

(75) Inventors: Steven Joseph Branda, Rochester, MN (US); John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1414 days.

(21) Appl. No.: 11/330,687

(22) Filed: Jan. 12, 2006

(65) Prior Publication Data

US 2007/0169003 A1 Jul. 19, 2007

(51) Int. Cl.
G06F 9/44 (2006.01)
G06F 9/45 (2006.01)
(52) U.S. Cl. .................. 717/130; 717/128; 717/158
(58) Field of Classification Search .................. 717/130
See application file for complete search history.

(56) References Cited

U.S. PATENT DOCUMENTS

| | | | | |
|---|---|---|---|---|
| 5,471,526 A | * | 11/1995 | Linnermark et al. | 379/268 |
| 5,594,904 A | * | 1/1997 | Linnermark et al. | 717/124 |
| 6,539,501 B1 | * | 3/2003 | Edwards | 714/45 |
| 6,708,173 B1 | * | 3/2004 | Behr et al. | 1/1 |
| 6,789,156 B1 | * | 9/2004 | Waldspurger | 711/6 |
| 7,047,521 B2 | * | 5/2006 | Bunnell | 717/130 |
| 7,249,288 B2 | * | 7/2007 | Peled et al. | 714/47 |
| 7,263,599 B2 | * | 8/2007 | Norden et al. | 712/205 |
| 7,266,810 B2 | * | 9/2007 | Karkare et al. | 717/130 |

OTHER PUBLICATIONS

Fernandes et al. (J2EE application profiling in WebSphere Studio, 2003, http://www.ibm.com/developerworks/websphere/library/techarticles/0311$_{13}$manji/manji1.html, retrieved on Dec. 23, 2009).*
Ortin et al. (Dynamic adaptation of application aspects, The Journal of Systems and Software, vol. 71, 2004, pp. 229-243).*
Hartel et al. (The Operational Semantics of a Java Secure Processor, Lecture Notes in Computer Science, Formal Syntax and Semantics of Java; vol. 1523, 1999, pp. 313-352).*
Orso et al. (Selective Capture and Replay of Program Executions, Work shop on Dynamic Analysis, 2005).*

(Continued)

Primary Examiner—Lewis A Bullock, Jr.
Assistant Examiner—Hang Pan
(74) Attorney, Agent, or Firm—Wood, Herron & Evans LLP

(57) ABSTRACT

An apparatus, program product and method associate a unique key with routines in an application to enable a profiler to ascertain whether to collect profile information for a routine during its execution. A key may be generated, for example, during deployment or installation of an application in an application server or other runtime environment, and subsequently associated with the routines in the application, e.g., by storing the key in the class and/or library files for the application. By doing so, each application in a runtime environment may be uniquely identified by a profiler during execution, such that profile information will only be collected for those applications for which profiling has been enabled.

22 Claims, 3 Drawing Sheets

OTHER PUBLICATIONS

IBM (IBM Developer Kit and Runtime Environment, Java2 Technology Edition, Version 1.4.1 Diagnostics Guide, Apr. 2004).*

Reiss et al. (Generating Java trace data, Proceedings of the ACM 2000 conference on Java Grande, 2000).*

Czajkowski (Application isolation in the Java Virtual Machine, Proceedings of the 15th ACM SIGPLAN conference, 2000).*

Fernandes, Benedict et al., "J2EE Application Profiling in WebSpere Studio" (Jan. 28, 2003) downloaded from http://www-128.ibm.com/devloperworks/websphere/library/techarticles/0311_manji/manj . . . on Jul. 26, 2005, 16 pages.

Krishnamurthy, Ramchandar, "Performance Analysis of J2EE Applications Using AOP Techniques" (May 12, 2004) downloaded from http://www.onjava.com/lpt/a/4793 on Jul. 26, 2005, 9 pages.

* cited by examiner

SELECTIVE PROFILING OF PROGRAM CODE EXECUTING IN A RUNTIME ENVIRONMENT

FIELD OF THE INVENTION

The present invention generally relates to computers and computer software, and more particularly, to computer software profiling.

BACKGROUND OF THE INVENTION

As computers and the computer software executing on computers becomes more complex and powerful, performance analysis techniques have increased in importance for optimizing the performance and reliability of computer software. One technique that has been found to be useful in connection with analyzing the performance of computer software is profiling.

With profiling, a tool commonly referred to as a profiler is used to capture events and other statistical information about program code being profiled. For example, a profiler may be used to capture information regarding memory and other resource usage for the purpose of identifying potential memory leaks, garbage collection problems, or other circumstances that may lead to excessive consumption of system resources. As another example, a profiler may be used to capture information such as the time spent in various routines, the number of instances created for certain object classes, and the state of a call stack for the purpose of identifying particular sections of program code that perform sub-optimally. Profiling may be performed by instrumenting program code prior to compilation, or alternatively, a runtime environment may support data collection capabilities to capture relevant profiling information for uninstrumented program code.

Profiling may be utilized in a number of computer environments. For example, profiling may be utilized for profiling program code executing within a JAVA virtual machine (JVM). The JAVA architecture, for example, includes a profiling API that extracts profiling information for program code executing in a JVM.

The profile extraction functionality in a JVM, however, has been found to be limited in certain circumstances, and in particular, in connection with profiling JAVA applications deployed to a J2EE application server running in a JVM. An application server generally provides a runtime environment for the applications that are deployed to the application server, and JAVA applications that execute in a J2EE application server all run in a common process with the application server. As a result, in many conventional JVM-based profilers, the collection of profiling information for one of the applications executing in an application server requires that profiling information also be collected for the other applications executing in the application server, as well as the application server itself, because such profilers are generally incapable of distinguishing between different applications executing in the same process.

Collecting profile information for the application server and other applications in connection with collecting profile information for an application of interest, however, presents a number of problems. First, profiling the application server and the other applications typically causes the application server to run slower. It is often desirable for the application server to run as fast as possible when profiling to recreate the real world environment for the application as much as possible. Second, the profile information collected from the application server and the other applications often obscures the information for the application of interest. An application server may have hundreds or thousands of classes, so even if a developer was profiling a small application containing 20 or so classes, the developer would have to sift through profiling information for every class in the application server even though he or she was probably only interested in the 20 or so classes that comprise the application of interest.

Some conventional profilers attempt to address this problem by using package and class name filtering to restrict the collection of profile information to only certain classes executing in a JVM. For example, if a developer wanted to profile an application named "App A" they could enter the package filter "com.customer.AppA.*", whereby the profiler would collect profile information only for classes that were part of this package.

While package and class name filtering is sufficient in some circumstances, there are several problems with a filter-based approach that limits its usefulness in other circumstances. First, filtering relies on a developer to use proper package naming during development. Any departure from proper naming and packaging conventions by a developer may make it difficult to properly profile an application at a later date. Second, filtering requires a familiarity with the naming conventions used for an application. As a result, testers or administrators not familiar with an application may find it difficult to configure a profiler to profile an application of interest. Third, some applications may have hundreds or thousands of classes distributed through several packages. As a result, defining filters for all of the packages in such an application would be extremely difficult using a filter-based approach.

Therefore, a significant need continues to exist in the art for an improved manner for profiling applications executing in an application server or like runtime environment.

SUMMARY OF THE INVENTION

The invention addresses these and other problems associated with the prior art by providing an apparatus, program product and method that associate a unique key with routines in an application to enable a profiler to ascertain whether to collect profile information for a routine during its execution. A key may be generated, for example, during deployment or installation of an application in an application server or other runtime environment, and subsequently associated with the routines in the application, e.g., by storing the key in the class and/or library files for the application. By doing so, each application in a runtime environment may be uniquely identified by a profiler during execution, such that profile information will only be collected for those applications for which profiling has been enabled.

In particular, profile information may be collected in a runtime environment by, in response to calling a routine in the runtime environment, accessing a key, which is associated with the routine, and which is uniquely associated with an application, to determine whether the routine is in an application for which profiling has been enabled, and collecting profile information for the routine only if the routine is associated with an application for which profiling has been enabled.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
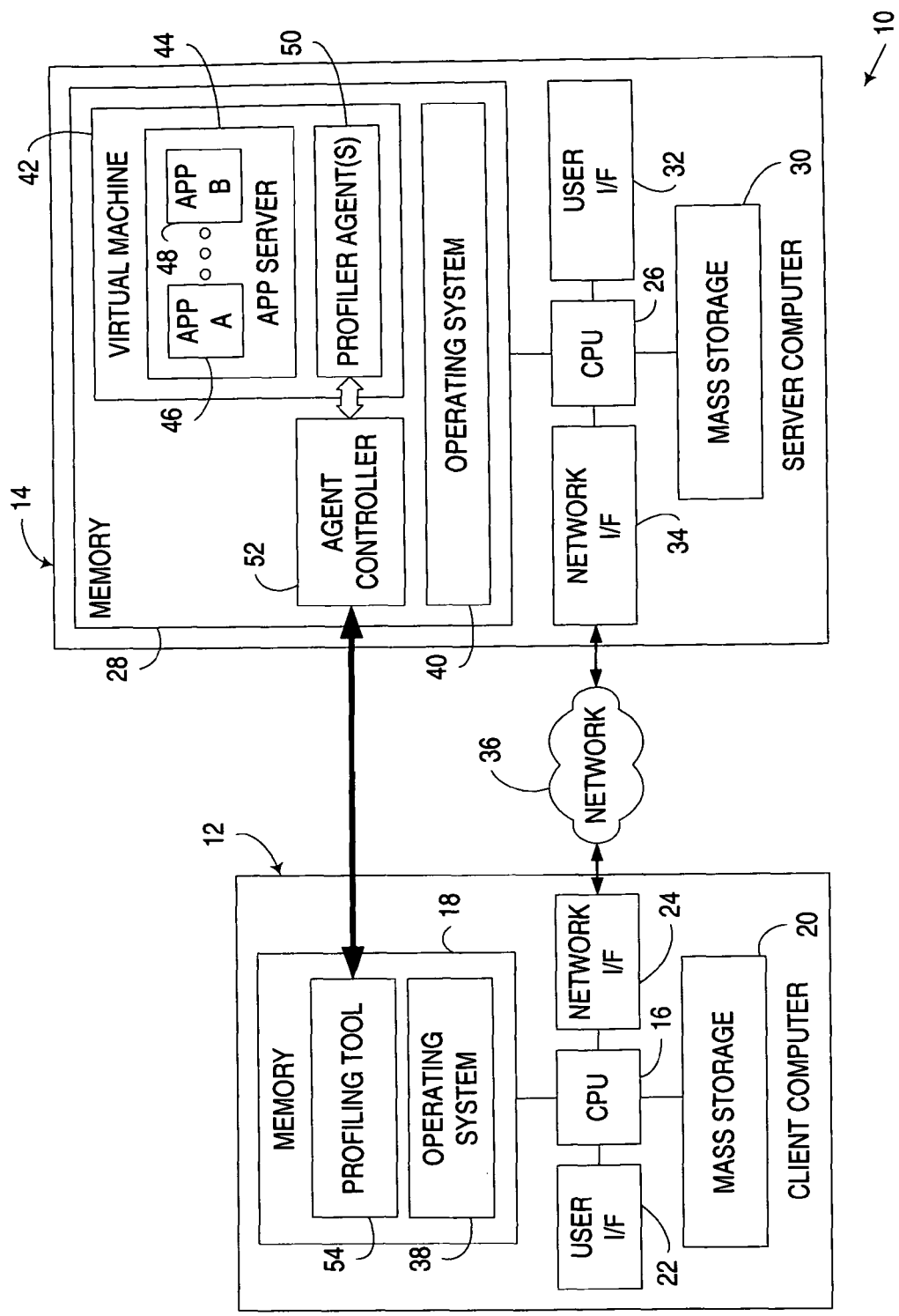
FIG. 1 is a block diagram of a client-server computer system incorporating a profiler consistent with the invention.

The herein-described embodiments rely upon keys that are unique with respect to the applications installed within a runtime environment to enable a profiler executing within or otherwise attached to the runtime environment to collect profile information only on those applications for which profiling has been enabled. During deployment or installation of an application in a runtime environment, a unique key is generated for the application, and this key is associated with each routine in the application in a manner that enables a profiler to access the key when the routine is called to determine whether or not profile information should be collected for that routine. By doing so, the profiling decision is taken out of the developer's domain, thus freeing a developer to arrange the routines in an application in packages, classes, etc. without concern for later profiling.

For example, in one implementation of the invention described in greater detail below, which relies on a J2EE application server runtime environment, a key is generated for a JAVA application by applying a cryptographic hash function to the undeployed application EAR file to generate a cryptographic hash value for the application. This key is then embedded into a private field in each class in the application when each class is compiled and placed in the deployed EAR file. The application is then installed in the application server.

Further in the herein-described implementation, when a developer wishes to profile the application, he or she either starts up the application server with the profiler, or connects to an application server already running with a profiler. Then, when the profiler connects to the application server, the profiler obtains a list of the applications and their unique tags from the application server. The developer is then presented with a list of applications that are deployed in the application server with a checkbox next to each application. The developer then checks all the applications he or she wants to profile, and starts profiling and running load against the server.

Whenever a method is executed in the herein-described implementation, the profiler checks the unique tag of the class it is defined in. If that tag matches the tag of one of the selected applications, then the profiler collects performance data on that method and all of the methods called by it and its children, i.e., any program code called directly or indirectly by the method. Of note, such child methods may include methods in the application server code in some embodiments, as it may be desirable to profile any application server code called directly or indirectly by an application of interest, e.g., to diagnose whether an application was running slowly because of the application code or the application server code. In general, however, the bulk of the application server code typically is not profiled as the profiling is limited to those methods in the application server code that were directly or indirectly called by the application(s) of interest. It will also be appreciated that depth filtering may be used to limit how far down a chain of child methods profiling will be performed.

It will be appreciated that the herein-described implementation generally provides greater ease of use to developers and other users due to the simplified interface for application filtering and the ability to provide explicit integration with an application server. Applications may be developed without having to specifically address profiling concerns during development, and users that do not otherwise have a familiarity with the naming conventions and other details about a particular application may nonetheless perform profiling on such an application through a relatively simple and intuitive user interface.

A key may be generated for an application in practically any manner so long as the key is unique to application with respect to all other applications installed in the same application server or runtime environment. In addition, while a key may be generated from the name of an application, in many instances, the key may be generated from other information in addition to or in lieu of the name of the application. As noted above, a key may be generated from a cryptographic hash of some or all of the program code for an application, and may be generated from a hash of source, intermediate and/or object code in different embodiments. A hash may also be performed on other information associated with an application, e.g., a name and/or a path for the application. A key may also be assigned from a monotonic sequence of numbers, e.g., using a stateful key that is incremented for each new application installed into an application server. A key may also be generated from a random or pseudorandom number, e.g., a cryptographically generated random number. A key may also be derived from the application name, e.g., additionally including the installed filepath for the application in the application server, the version of the application, or any other information that distinguishes the application from other applications that may be installed in a given runtime environment.

Moreover, a key may be associated with a routine in an application using a number of manners consistent with the invention. For example, in a JAVA application, where routines take the form of methods, a key may be associated with each method in an application by storing the key in a field in each class in the application, e.g., in a private field in each class, during deployment or installation of the application in an application server. In other embodiments, keys may be associated with intermediate language program code, e.g., within the JAVA bytecode for a JAVA application or in the MSIL code for a .NET application. It will be appreciated that in other environments, keys may be associated with routines via other relationships and/or during different stages in the deployment, installation, activation or execution of an application in a runtime environment. Furthermore, it will be appreciated that keys may be associated with routines directly, or indirectly (e.g., as in the case of storing keys in the classes of a JAVA application rather than in each method of each class). Other variations will be apparent to one of ordinary skill in the art having the benefit of the instant disclosure.

Moreover, it will be appreciated that profiling in the manner described herein may be utilized in any number of runtime environments consistent with the invention, e.g., within intermediate or portable language-based runtime environments other than JAVA such as the .NET CLR runtime environment. Profiling in the manner described herein may also be utilized in other runtime environments where an application server or other form of middleware provides a container within which one or more applications executes, particularly where the profiling functionality used to collect profile information for an application is capable of being attached to the runtime environment, but not necessarily to any particular application in the runtime environment. In the illustrated embodiment described herein, for example, JAVA applications are deployed to a runtime environment that includes the J2EE application server executing in a JVM, and these applications execute in a common process with the application server and with one another. Other runtime environments may utilize the profiling techniques described herein, as will be appreciated by one of ordinary skill in the art having the benefit of the instant disclosure.

Turning now to the Drawings, wherein like numbers denote like parts throughout the several views, FIG. 1 illustrates an exemplary client-server based computer system or environment 10 within which application profiling may be performed in a manner consistent with the invention. System 10 includes at least one apparatus, e.g., one or more client computers 12 and one or more server computers 14. For the purposes of the invention, each computer 12, 14 may represent practically any type of computer, computer system or other programmable electronic device capable of functioning as a client and/or server in a client-server environment. Moreover, each computer 12, 14 may be implemented using one or more networked computers, e.g., in a cluster or other distributed computing system. Moreover, as is common in many client-server systems, typically multiple client computers 12 will be interfaced with a given server computer 14. In the alternative, profiling consistent with the invention may be implemented within a single computer or other programmable electronic device, e.g., a single-user computer or a multi-user computer.

Computer 12 typically includes a central processing unit 16 including at least one microprocessor coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 20 or on another computer coupled to computer 12. Computer 12 also typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 12 may include an interface 24 with one or more networks (e.g., a LAN, a WAN, a wireless network, and/or the Internet, among others) to permit the communication of information with other computers and electronic devices. It should be appreciated that computer 12 typically includes suitable analog and/or digital interfaces between CPU 16 and each of components 18, 20, 22 and 24 as is well known in the art.

In a similar manner to computer 12, computer 14 includes a CPU 26, memory 28, mass storage 30, user interface 32 and network interface 34. However, given the nature of computers 12 and 14 as client and server, in many instances computer 14 will be implemented using a multi-user computer such as a server computer, a midrange computer, a mainframe, etc., while computer 12 will be implemented using a desktop or other single-user computer. As a result, the specifications of the CPU's, memories, mass storage, user interfaces and network interfaces will typically vary between computers 12 and 14. Other hardware environments are contemplated within the context of the invention.

Computers 12, 14 are generally interfaced with one another via a network 36, which may be public (e.g., the Internet) and/or private, wired and/or wireless, local and/or wide-area, etc.

Each computer 12, 14 operates under the control of an operating system 38, 40, and executes or otherwise relies upon various computer software applications, components, programs, objects, modules, data structures, etc. Moreover, various applications, components, programs, objects, modules, etc. may also execute on one or more processors in another computer coupled to computer 12, 14 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Now turning to the illustrated embodiment, a runtime environment, taking the form of a JAVA Virtual Machine 42, includes a J2EE application server 44 within which executes one or more applications, e.g., application 46 ("App A") and application 48 ("App B"). As is well known in the art, application server 44 and applications 46, 48 execute within a single process. Profiling in the illustrated embodiment is implemented using a profiler that incorporates one or more profiler agents 50 executing within the JVM 42, which are configured to forward profile information to an agent controller 52 that resides outside of the JVM. A profiling tool 54, resident in a client 12, communicates with agent controller 52 and provides a user interface through which a user may configure the profiler and receive profile information generated during execution of applications 46, 48 in application server 44. One profiler having an architecture similar to that illustrated in FIG. 1 is the WEBSPHERE Studio Application Developer profiler, the use and configuration of which is generally known in the art.

Figure 2:
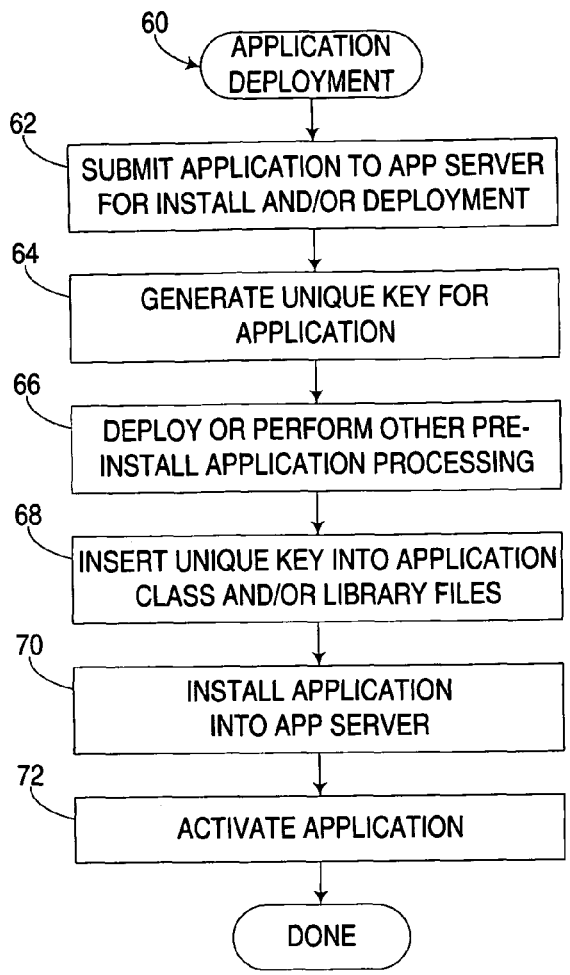
FIG. 2 is a flowchart illustrating the program flow of an application deployment routine used to deploy an application in the computer system of FIG. 1.

To implement profiling in the embodiment of FIG. 1, a key is generated and associated with an application in connection with deployment of the application into the runtime environment provided by application server 44. FIG. 2, for example, illustrates at 60 one suitable process for deploying an application in the environment of FIG. 1.

Deployment begins in block 62 by submitting the application to the application server 44 for installation and/or deployment. Next, in block 64, a unique key is generated for the application using any of the manners described above, e.g., via a cryptographic hash of the undeployed application EAR file. Next, in block 66, the application is deployed, or alternatively, other pre-install application processing is performed. Next, in block 68, the unique key is inserted into the application class and/or library files, and thereafter, the application is installed into the application server in block 70. Once the application is installed, the application is activated in block 72, whereby deployment of the application is complete. It will be appreciated that the steps involved in deploying the application, with the exception of generation of the key and insertion of the key into the application class and/or library files, generally conform to standard application deployment in a J2EE application server, and as a result, a user is generally not burdened with any particular profiling-specific tasks when deploying an application. It will be appreciated that different manners for deploying and/or installing an application may be utilized for other runtime environments.

Figure 3:
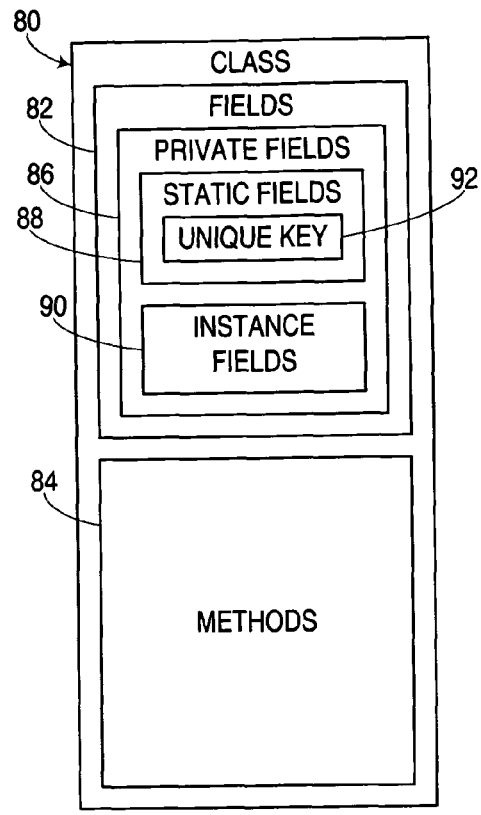
FIG. 3 is a block diagram of an exemplary class data structure incorporating a unique key embedded therein by the routine of FIG. 2.

As noted above, a key is associated with each routine of an application via inserting the key into the application class and/or library files. FIG. 3, for example, illustrates an exemplary class file 80 including separate field and method data structures 82, 84. Within the field data structure is included one or more private fields 86, which may include static fields 88, as well as instance fields 90. In the illustrated embodiment, the unique key 92 is added as a static field 88 in the class file. As such, whenever a method from the class file is executed, the profiler is able to determine whether the profiling has been enabled for the method by accessing the private, static field 92 corresponding to the unique key.

It will be appreciated that other manners of associating a unique key with each routine of an application may be utilized in other embodiments. Therefore, the invention is not limited to the particular implementation illustrated in FIG. 3.

Figure 4:
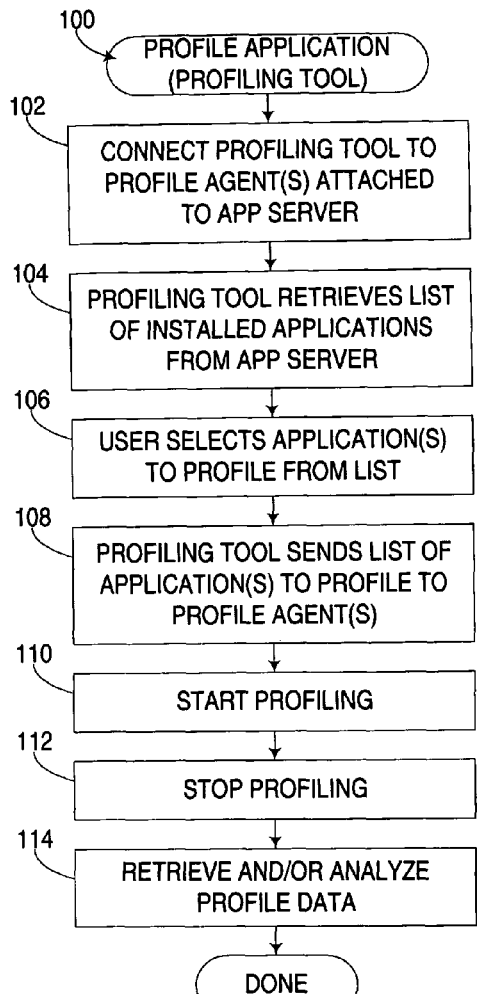
FIG. 4 is a flowchart illustrating the program flow of a profile application routine executed by the profiling tool referenced in FIG. 1.

Once an application has been installed into the runtime environment, the application is ready for profiling. FIG. 4 next illustrates a profile application routine 100 executed by profiling tool 54 (FIG. 1) to profile an application of interest.

Routine 100 begins in block 102 by connecting profiling tool 54 to the profiler agent(s) 50 attached to application server 44, via interaction between profiling tool 54 and agent controller 52 (FIG. 1). Once connected, tool 54 retrieves a list of installed applications from application server 44 in block 104. Tool 54 may also be provided with a list of the unique keys associated with the installed applications at this time.

Next, in block 106, the user selects one or more applications to profile from the list, and in block 108, profiling tool 54 sends a list of applications to be profiled to the profile agents 50 via the agent controller 52.

Next, in block 110, the user is able to initiate profiling with profiling tool 54, whereby profiling is performed until the user requests the profiling be stopped in block 112. Once profiling is complete, the user may then retrieve and otherwise analyze the profile data in block 114, whereby profiling of the application is complete.

Figure 5:
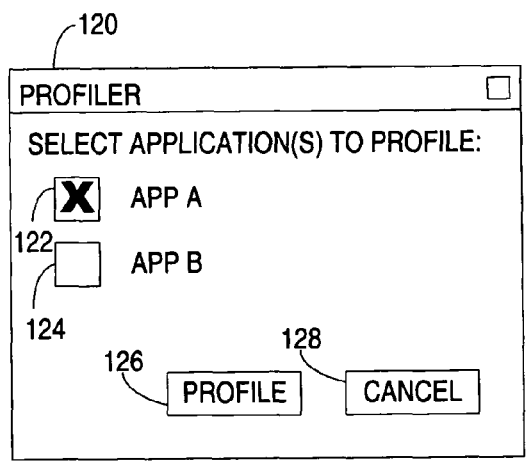
FIG. 5 is a block diagram of an exemplary user interface window used to enable a user to select applications for profiling in connection with the routine of FIG. 4.

The manner in which a user may be presented with a list of installed applications from an application server, as well as the manner in which a user may select one or more applications to be profiled, can vary in different embodiments. FIG. 5, for example, illustrates an exemplary user interface 120 for profiling tool 54, where is user is provided with a list of applications that are currently installed on the application server, with check boxes (e.g., check box 122 for App A and check box 124 for App B) provided to enable a user to select which of the installed applications the user wishes to profile. As shown in FIG. 5, for example, check box 122 is selected, while check box 124 is unselected, such that only App A is enabled for profiling.

Once a user selects one or more applications to profile, profiling may be initiated by selecting button 126. Otherwise, if the user wishes to abort the operation, the user may select cancel button 128. It will be appreciated that other mechanisms for displaying a list of applications and/or receiving user input to select one or more applications for which profiling should be enabled, may be used in different embodiments.

Figure 6:
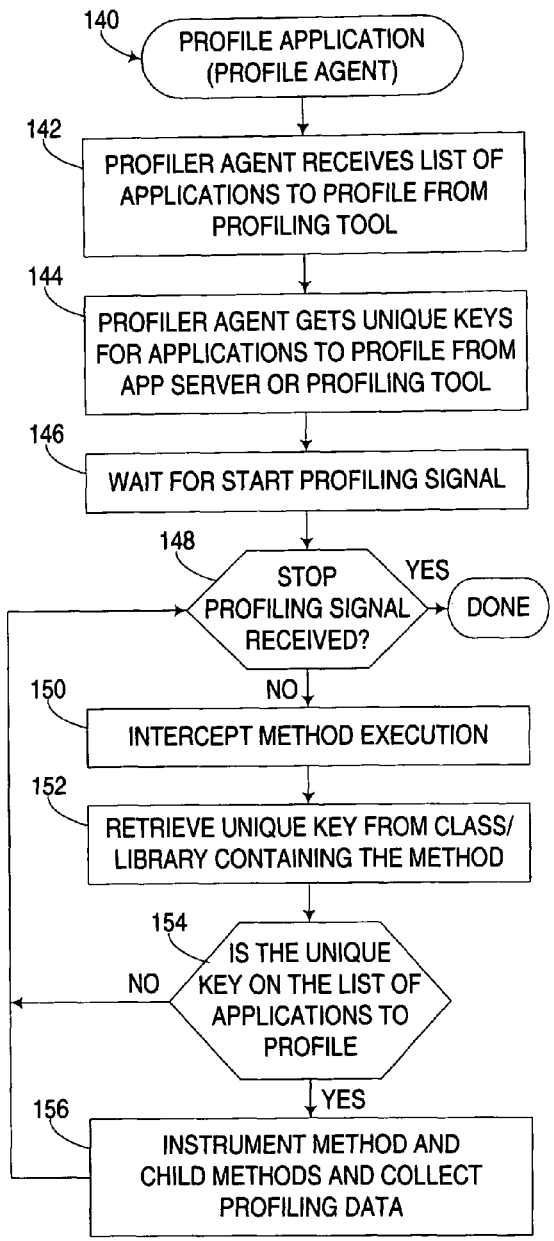
FIG. 6 is a flowchart illustrating the program flow of a profile application routine executed by the profiler agent referenced in FIG. 1.

FIG. 6 next illustrates a profile application routine 140 executed by a profile agent 50 responsive to the configuration and control of the profiling tool as described above in connection with FIG. 4. Routine 140 begins in block 142 by receiving a list of applications to profile from the profiling tool. Once the list of applications is received, block 144 obtains the unique keys associated with the applications to be profiled from either the application server or the profiling tool. The profiling agent then waits in block 146 for a start profiling signal to be received from the profiling tool.

Once the start profiling signal is received, control passes to block 148 to initiate profiling until a stop profiling signal is received. So long as no stop profiling signal has been received, block 148 passes control to block 150 to intercept a method execution (e.g., by detecting the calling of a method) from the application, in much the same manner as a conventional profiler. Block 152 then retrieves the unique key for the application with which the method is associated from the class or library containing the method. Block 154 then determines whether the unique key is on the list of applications to be profiled. If not, block 154 returns control to block 148. Otherwise, if the unique key is on the list of applications to be profiled, block 154 passes control to block 156 to instrument the method and any child methods therefor, and to collect profiling data, generally in any suitable manner known in the profiling art. Block 156 then passes control to block 148 to continue profiling until a stop profiling signal is received. Once such a signal is received, routine 140 is complete. It will be appreciated that the collected profile information is then capable of being retrieved and analyzed by a developer in a conventional manner.

Embodiments consistent with the invention are therefore capable of selectively enabling profiling for a subset of applications executing in an application server or a similar runtime environment in a manner that does not require specific familiarity with the applications or require a developer for an application to specifically configure any application to address profiling concerns. It will be appreciated that a wide variety of other modifications may be made to the illustrated embodiments without departing from the spirit and scope of the invention. The invention therefore lies in the claims hereinafter appended.

What is claimed is:

1. A method of collecting profile information for a JAVA application running in a J2EE application server, the method comprising:

for each of a plurality of JAVA applications, generating a unique key therefor and storing the unique key to associate the unique key with each class therein, wherein each class comprises one or more routines;

receiving user input to enable profile information collection for a first JAVA application among the plurality of JAVA applications; and during execution of the first JAVA application in the J2EE server:

collecting profile information for a first routine associated with the first JAVA application and a second routine called by the first routine in response to determining that the first routine is associated with a first class having a key associated with the first JAVA application; and executing a third routine associated with a second JAVA application without collecting profile information therefor in response to determining that the third routine is associated with a second class having a key associated with the second JAVA application for which profile information collection is not enabled.

2. A method of collecting profile information in a runtime environment, the method comprising:

enabling profiling on a first application among a plurality of applications in response to user input while profiling on a second application among the plurality of applications is not enabled, wherein each of the plurality of applications has associated therewith a unique key generated and stored to associate each application's unique key with a plurality of routines in such application, and wherein the unique key for each of the plurality of applications is accessible when any of the plurality of routines in such application is called to determine whether profiling is enabled for such application;

in response to calling a first routine in the first application, accessing the unique key associated with the first routine to determine whether profiling is enabled for the first application collecting profile information for the first routine and a second routine called by the first routine only if the first routine is determined from the unique key for the first application to be in an application for which profiling has been enabled;

in response to calling a third routine in the second application, accessing the unique key associated with the third routine to determine whether profiling is enabled for the second application; and executing the third routine without collecting profile information for the third routine in response to determining from the unique key for the second application that the third routine is in the second application for which profiling has not been enabled.

3. The method of claim 2, wherein the routine is defined in a class in a first application, and wherein the key is uniquely associated with the first application.

4. The method of claim 3, further comprising collecting profile information for a child of the first routine based upon the key associated with the first routine.

5. The method of claim 3, wherein the key is associated with the class.

6. The method of claim 5, wherein the key is stored in a field associated with the class.

7. The method of claim 6, wherein the field is a private field.

8. The method of claim 5, further comprising generating the key and associating the key with the routine.

9. The method of claim 8, wherein associating the key with the routine is performed during compilation of the routine.

10. The method of claim 8, wherein generating the key and associating the key with the routine are performed during installation of the first application.

11. The method of claim 8, wherein generating the key and associating the key with the routine are performed during deployment of the first application in the runtime environment.

12. The method of claim 3, wherein the routine includes a name, and wherein the key includes information other than the name of the routine.

13. The method of claim 12, wherein the name of the routine identifies the class and a package within which the class is defined.

14. The method of claim 3, wherein the key includes a hash value generated by performing a hash function on program code in the first application.

15. The method of claim 2, further comprising:

identifying that the first and second applications are currently executing in the runtime environment;

generating a list of applications that are currently executing in the runtime environment for display to a user, wherein the list includes the first and second applications; and after generating the list of applications, receiving user input to enable profiling on the first application without enabling profiling on the second application.

16. The method of claim 3, wherein the runtime environment and the first application execute in a common process with an application server, and wherein collecting profile information for the routine is performed without collecting profile information for at least one routine in the application server.

17. The method of claim 3, wherein the runtime environment includes an application server, and wherein the first application executes within the application server.

18. The method of claim 17, further comprising, during deployment of the first application into the runtime environment, generating the key for the first application and embedding the key in each class associated with the first application.

19. An apparatus, comprising:
   a processor; and
   program code configured to be executed by the processor to collect profile information in a runtime environment by the following steps:
      enabling profiling on a first application among a plurality of applications in response to user input while profiling on a second application among the plurality of applications is not enabled, wherein each of the plurality of applications has associated therewith a unique key generated and stored to associate each application's unique key with a plurality of routines in such application, and wherein the unique key for each of the plurality of applications is accessible when any of the plurality of routines in such application is called to determine whether profiling is enabled for such application;
      in response to calling a first routine in the first application, accessing the unique key associated with the first routine to determine whether profiling is enabled for the first application;
      collecting profile information for the first routine and a second routine called by the first routine only if the first routine is determined from the unique key for the first application to be in an application for which profiling has been enabled;
      in response to calling a third routine in the second application, accessing the unique key associated with the third routine to determine whether profiling is enabled for the second application; and
      executing the third routine without collecting profile information for the third routine in response to determining from the unique key for the second application that the third routine is in the second application for which profiling has not been enabled.

20. The apparatus of claim 19, wherein the routine is defined in a class in a first application and the key is uniquely associated with the first application, the program code further configured to, during deployment of the first application to the runtime environment, generate the key and associate the key with the routine.

21. The apparatus of claim 20, wherein the runtime environment comprises an application server, wherein the first application comprises an application that executes within the application server, and wherein associating the key with the routine includes embedding the key in each class associated with the first application.

22. A program product, comprising:
   program code configured to collect profile information in a runtime environment by the following steps:
      enabling profiling on a first application among a plurality of applications in response to user input while profiling on a second application among the plurality of applications is not enabled, wherein each of the plurality of applications has associated therewith a unique key generated and stored to associate each application's unique key with a plurality of routines in such application, and wherein the unique key for each of the plurality of applications is accessible when any of the plurality of routines in such application is called to determine whether profiling is enabled for such application;
      in response to calling a first routine in the first application, accessing the unique key associated with the first routine to determine whether profiling is enabled for the first application;
      collecting profile information for the first routine and a second routine called by the first routine only if the first routine is determined from the unique key for the first application to be in an application for which profiling has been enabled;
      in response to calling a third routine in the second application, accessing the unique key associated with the third routine to determine whether profiling is enabled for the second application; and
      executing the third routine without collecting profile information for the third routine in response to determining from the unique key for the second application that the third routine is in the second application for which profiling has not been enabled; and
   a non-transitory computer readable medium bearing the program code.

* * * * *